United States Patent
Goslin et al.

(10) Patent No.: US 11,508,127 B2
(45) Date of Patent: Nov. 22, 2022

(54) CAPTURING AUGMENTED REALITY ON A HEAD MOUNTED DISPLAY

(71) Applicant: Disney Enterprises, Inc., Burbank, CA (US)

(72) Inventors: Michael P. Goslin, Sherman Oaks, CA (US); Nathan D. Nocon, Valencia, CA (US); Jonathan R D Hsu, Pomona, CA (US); Eric C. Haseltine, Silver Spring, MD (US); Elliott H. Baumbach, Porter Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/190,037

(22) Filed: Nov. 13, 2018

(65) Prior Publication Data

US 2020/0151956 A1 May 14, 2020

(51) Int. Cl.
   *G06T 19/00* (2011.01)
   *G02B 27/01* (2006.01)
(52) U.S. Cl.
   CPC .......... *G06T 19/006* (2013.01); *G02B 27/017* (2013.01); *G02B 2027/014* (2013.01); *G02B 2027/0138* (2013.01)
(58) Field of Classification Search
   CPC ................ G06T 19/006; G02B 27/017; G02B 2027/014; G02B 2027/0138
   See application file for complete search history.

(56) References Cited

U.S. PATENT DOCUMENTS

| | | | | |
|---|---|---|---|---|
| 9,298,283 | B1* | 3/2016 | Lin | G06F 3/147 |
| 2016/0349509 | A1* | 12/2016 | Lanier | G02B 27/0172 |
| 2017/0257618 | A1* | 9/2017 | Haseltine | G03B 17/565 |
| 2017/0323485 | A1* | 11/2017 | Samec | A61B 5/6898 |
| 2018/0082482 | A1* | 3/2018 | Motta | G02B 27/0172 |
| 2018/0095616 | A1* | 4/2018 | Valdivia | H04L 51/16 |
| 2018/0096533 | A1* | 4/2018 | Osman | A63F 13/25 |
| 2019/0011703 | A1* | 1/2019 | Robaina | G06F 3/013 |
| 2019/0094981 | A1* | 3/2019 | Bradski | G02B 30/26 |
| 2019/0374857 | A1* | 12/2019 | Deller | G06T 13/40 |
| 2020/0049992 | A1* | 2/2020 | Peng | G06F 3/012 |
| 2020/0124857 | A1* | 4/2020 | Bierhuizen | G02B 17/0856 |

FOREIGN PATENT DOCUMENTS

| | | | | |
|---|---|---|---|---|
| CN | 110168428 | A | * | 8/2019 |
| IL | 271129 | A | * | 2/2021 |

* cited by examiner

*Primary Examiner* — Chante E Harrison
(74) *Attorney, Agent, or Firm* — Patterson + Sheridan, LLP

(57) ABSTRACT

To capture augmented reality (AR) on a head mounted display the embodiments described herein include the optical display of virtual components of an AR on an AR device. A real world view within a field of view of the display of the AR device is captured, creating a composite image that combines the virtual components and real world physical components within the field of view of the AR device.

20 Claims, 6 Drawing Sheets

CAPTURING AUGMENTED REALITY ON A HEAD MOUNTED DISPLAY

BACKGROUND

Field of the Invention

This present disclosure relates to the optical display of an Augmented Reality (AR) System for capturing, recording and/or rendering an augmented reality experience of a user, including both virtual and real world components.

Description of the Related Art

Computer graphics technology has significantly progressed since the first video games were developed. Relatively inexpensive 3D graphics engines now provide nearly photo-realistic interactive gameplay on hand-held video game systems, home video game systems, and personal computer hardware platforms costing only a few hundred dollars. This interactive gameplay has also migrated to the virtual or augmented reality realms where the gameplay can incorporate virtual components of a game into a real world setting using specialized head mounted displays.

With the increased quality of gameplay, there has also been an increased interest in viewing others gameplay resulting in large scale streaming and video platforms dedicated to the viewing of live and recorded gameplay of both personal gameplay and gameplay of professional game players. While there are methods for streaming and recording augmented reality gameplay, the current methods fail to realistically capture what a game player is seeing and experiencing in an AR headset since the methods rely on external capture of the player's experience. This results in streaming of static scenes that seem more like a virtual reality setting to the viewers than a augmented reality setting.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method, including: capturing, using a visual sensor, an augmented reality (AR) environment image including virtual components reflected on a display of an AR device and a user environment background; and processing the AR environment image for external transmission. Other embodiments of this aspect include corresponding computer systems, apparatus, and computer programs recorded on one or more computer storage devices, each configured to perform the actions of the methods.

Another embodiment described herein is computer-readable program code configured to perform, when executed by a processor, an operation, the operation includes capturing, using a visual sensor, an augmented reality (AR) environment image including virtual components reflected on a display of an AR device and a user environment background; and processing the AR environment image for external transmission.

Another embodiment described herein is system comprising a processor and a memory comprising instructions which, when executed on the processor, performs an operation. In some examples, the operation includes capturing, using a visual sensor, an augmented reality (AR) environment image including virtual components reflected on a display of an AR device and a user environment background; and processing the AR environment image for external transmission.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments herein describe the realistic capturing of the augmented reality (AR), that is displayed to a user, including the virtual components, along with the real world content in order for the captured content to be streamed to other devices, servers, and/or the Internet in general. This allows for those who wish to view the AR that a user (game player) is playing to see both the AR components and the real world physical components. This can include both viewers who wish to view a user's gameplay for entertainment purposes and those, such as parents, who wish to view a user's gameplay to monitor the gameplay content.

Figure 1:
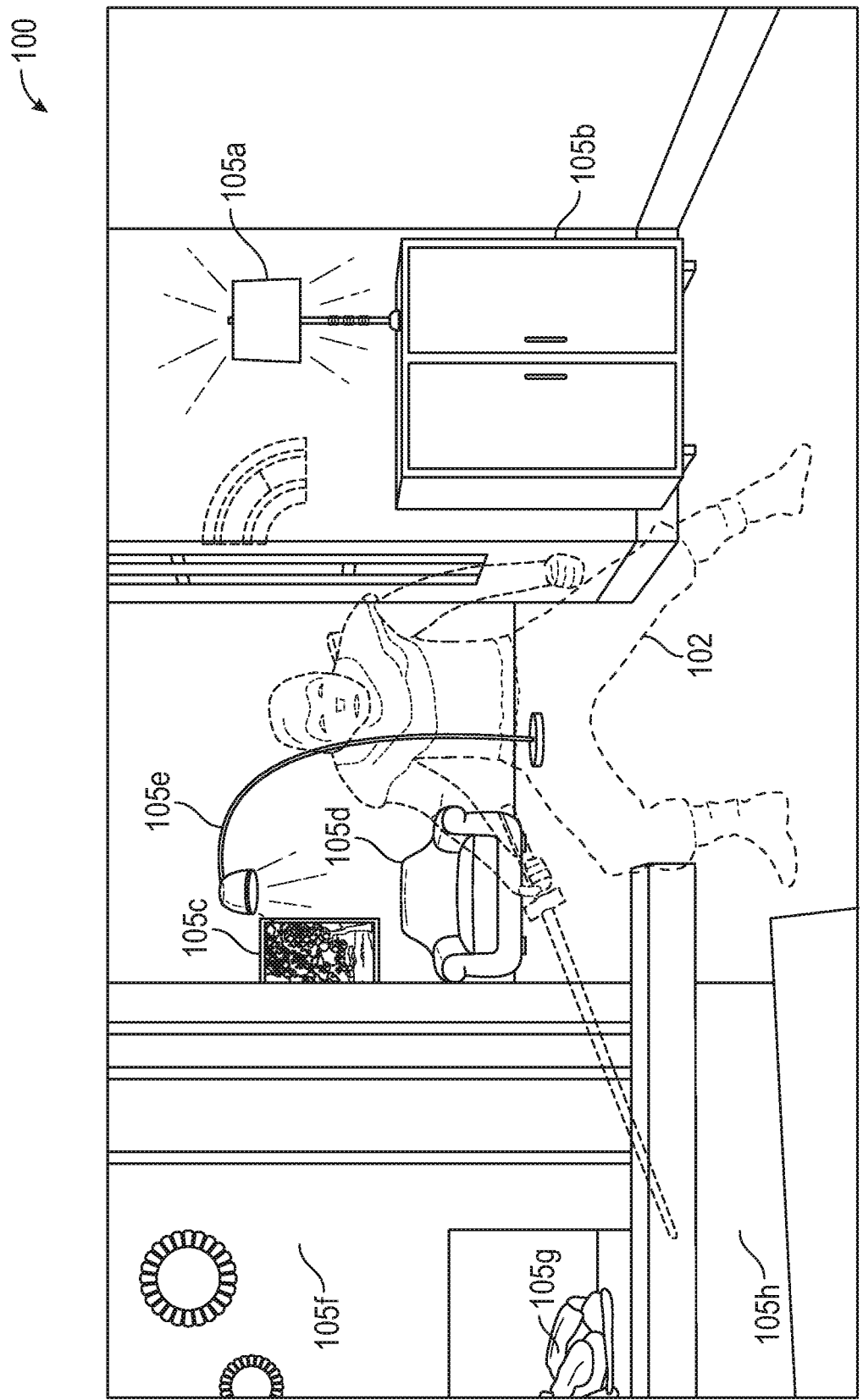
FIG. 1 is a field of view for an AR device including virtual and real components, according to one embodiment described herein.

In general AR systems involve the insertion of virtual content into captured images or views of a physical, real-world scene. For example, as shown in FIG. 1 which is a Field of View (FOV) for an AR device including virtual and real components, according to one embodiment described herein. As shown, FIG. 1 includes the FOV 100 of a AR device, such as AR device 200 described herein. The FOV 100 includes the physical components 105a-105h (e.g., a lamp, a bookcase, a floor, a chair, etc.) of the real word and the virtual components 102. As further described herein, the virtual components 102 are displayed by the AR device while the physical components 105a-105h are simply seen by the user of the AR device. In order to adequately capture what the user is seeing in FOV 100, the virtual components and the physical components must be combined in such a way to accurately render what the user is seeing.

Figure 2A:
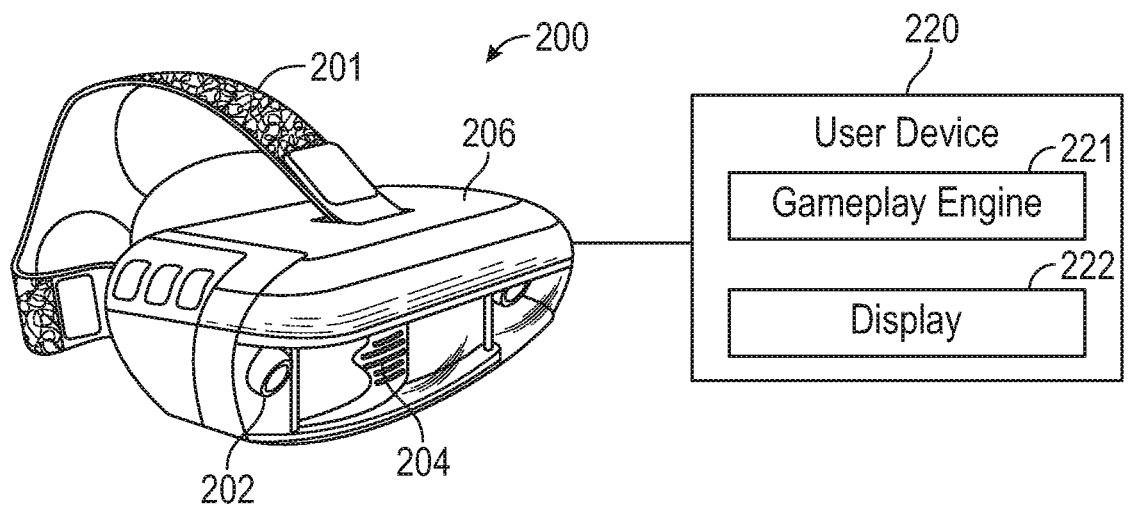
FIG. 2A is an AR system, according to one embodiment described herein.

FIG. 2 is an AR system, according to one embodiment described herein. As shown the AR system 200 includes a head mounted device (AR device 206), including the head mounted display 204 which displays AR components to a user. In some examples, the user's head is placed in space 201 such that user's eyes are facing the display 204 (and an eye tracking sensor 312 as discussed in relation to FIG. 3). In some examples, the AR device 206 includes a front facing visual sensor 202. In some examples described herein, the eye tracking sensor 312 and/or the front facing visual sensor 202 are used to track a user's eye in order to determine a focus point of the user.

In some examples, within the system 200, the AR device 206 communicates with a user device 220. This communication can be done wirelessly, through Wi-Fi and/or Bluetooth® communications or any other suitable method. Further, the AR device 206 can be integrated with the user device 220 directly (e.g., the user device 220 is fixed to a mount on the AR device 206), or connected through a wired connection. The AR device 206 can be a headset worn by the user, or may be any device including a visual display of any suitable type. For example, the AR device 206 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology.

In some embodiments, the AR device 206 is separate from the user device 220 but is configured to superimpose virtual imagery onto physical objects in the user's field of view. For example, the AR device 206 may be a body-worn device. The AR device 206 further includes a holder (not shown) for the user device 220. For example, the user device 305 can be a portable device like a smartphone or tablet. The user device 220 can be inserted into the holder in the AR device 206 during gameplay. The AR device 206 may also be configured as an eyepiece or lens worn in front of the user's eye. In another example, the AR device 206 may be integrated into other devices that are carried or handled by the user, or having any other suitable user interaction during the game playing experience.

Figure 2B:
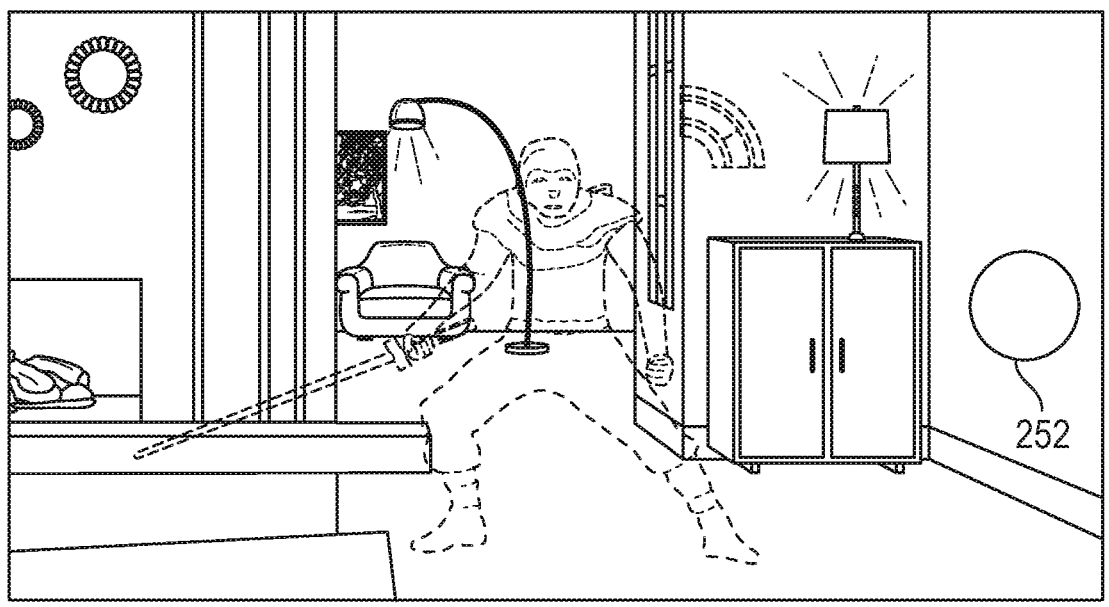
FIG. 2B is an example display output of an AR device, according to one embodiment described herein.
Figure 3:
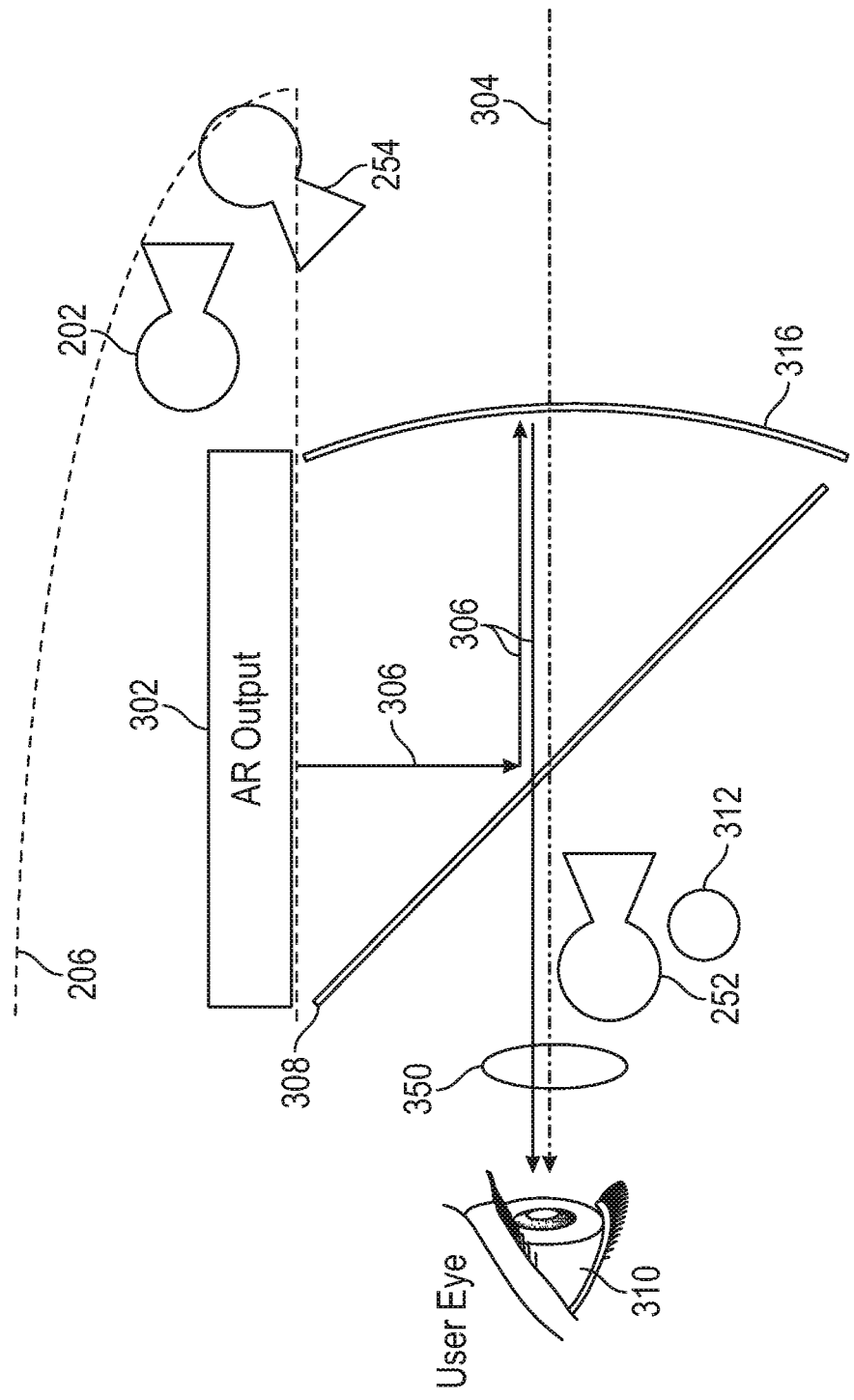
FIG. 3 illustrates capturing virtual and real world images, according to one embodiment described herein.

The AR device 206 includes the visual sensor 202 (and visual sensors 252 and 254 as shown in FIGS. 2B and 3). The visual sensors 202, 252, and 254 can include cameras configured to sense and capture visible light and/or infrared light. The visual sensors 202, 252, and 254 can be configured to capture images of a user's real-world, physical environment and the virtual components of the AR. In one embodiment, the AR device 206 uses the visual sensors 202, 252, and 254 to capture images of the physical controller user environment in order to generate a composite of the physical and virtual components as described herein.

In one embodiment, the AR device 206 includes audio input/output devices. The audio output devices may include conventional audio microphones and speakers having any suitable form factor (e.g., standalone, integrated in a stereo, headphones, etc.), as well as devices using alternative methods of producing and receiving sound perceptible by a user, such as bone conduction transducers in a body-worn device. In some embodiments, the audio output devices are included within the user device 220 (e.g., speakers of the smartphone, tablet device, etc.). In other embodiments, the audio output devices are separate from the user device 220.

In some embodiments, the user device 220 operates in an AR mode, generally configured to superimpose virtual images such as characters, objects, and/or dynamic visual effects into the user's natural FOV of the environment using the AR device 206. The field of view of the user is generally determined by the direction the user faces while wearing the AR device 206. In other embodiments, however, the user device 220 is configured to operate in a virtual reality (VR) mode while generating virtual imagery using the AR device 206.

The AR device 206 provides a compact AR display that may be carried or worn by the user during the gameplay experience. As discussed above, the AR device 206 may include devices that are separate from the display of the user device 220. Implementations of the compact AR display that use a smartphone or other mobile computing device offer several advantages. For example, implementations able to use the user's smartphone provide a reduced manufacturing cost of the compact AR display, as no separate computing hardware need be included. A camera included in the smartphone may also be used as a visual sensor to dynamically provide information regarding the physical environment and the user's field of view. Using a smartphone may also provide increased convenience to the user, and may provide a relatively large display for outputting virtual and composite content.

The user device 220 includes a display 222 and a gameplay engine 221. In one embodiment, the gameplay engine 221 (e.g., a software application executed by one or more processors in the user device 220 or the AR device 206) generates virtual content which is then outputted on the display 222. As described above, the virtual content can be inserted into a view of the real-world so it appears as if the virtual content is part of the real-world.

FIG. 2B is an example display output of an AR device, according to one embodiment described herein. For example, as a user is utilizing the AR device 206, the FOV 100 is displayed on the display 204, including both the physical and virtual components of the AR. As also shown in FIG. 2B, the visual sensor 252 is positioned within a line of sight between a user of the AR device 206 and the display of the AR device (display 204). As shown, the visual sensor 252 may be positioned such that it captures the FOV 100 as a AR environment image. In some examples, the visual sensor 252 is positioned to closely match the user's eye position, such that that no image processing is required to produce an image which accurately conveys the FOV 100. In other examples, where the visual sensor 252 is offset, image processing may be executed in order to convey the FOV 100.

FIG. 3 illustrates capturing AR and real world images, according to one embodiment described herein. For example, FIG. 3 illustrates an AR device 300 that may be used in the AR device 206 in FIG. 2A. As shown, an AR output 302 (e.g., the display 222 in the user device 220 in FIG. 2A) is mounted in a horizontal direction such that virtual content 306 generated by the AR output 302 is emitted down towards a beam splitter 308. While the beam splitter 308 reflects the light emitted by the AR output 302, light from a real-world view 304 can pass through the beam splitter 308 substantially unaffected by the splitter. In some examples, the beam splitter redirects the virtual content 306 to a lens 316 within the display 204. As a result, the light from the AR output 302 which defines the virtual content 306 is mixed with light from the real-world view 304 to generate an AR image 350 as viewed by the user eye 310. Stated differently, the virtual content 306 is superimposed onto the real-world view 304 before it reaches the user eye 310. As such, to the user it appears as if the virtual content 306 is part of the real-world environment. In some examples, the beam splitter 308 and the lens 316 are partially silvered (e.g., half-silvered) and/or use an optical film in order to properly reflect light passing over and/or through the components. In some examples, the lens 316 is a concave lens.

As also shown, the visual sensor 252 and the visual sensor 254 are optionally place on either side of the beam splitter 308. In some examples, the visual sensors 252, 254, and 202 comprise Red, Green, Blue (RGB) cameras that may be fixed and/or movable positioned in the AR device 206. As described in relation to FIG. 2B, the visual sensor 252 is within the line of sight of the user eye 310, that is between the lens 316 and the user eye 310. The visual sensor 254 is positioned on the real world side of the beam splitter 308. The AR image captured by the visual sensor 252 is substantially similar to the AR image 350, with only slight differences due to the angle of the placement of the sensor. In some examples, the AR image captured by the visual sensor 254 comprises is substantially similar to the AR image 350, but in some examples, the AR image captured by the visual sensor 254 is a mirrored version of the AR image 350 due to the beam splitter 308. In some examples, the AR image captured by visual sensor 254 is processed to address the distortion of the image on the mirrored lens 316 and in some examples, processed to correct horizontal/vertical inversion depending on visual sensor 254's location within AR device 206 (e.g., above lens 316 pointed back and down toward lens 316 as illustrated, or below lens 316 pointed back and up toward lens 316, on the side, etc.) The embodiments herein describe techniques for capturing AR and real world images. Additionally the eye tracking sensor 312 is positioned such that the AR device 206 determines a focus point of a user eye 310. In some examples, the eye tracking sensor 312 comprises a separate RGB and/or monochromatic visual sensor (camera).

Figure 4:
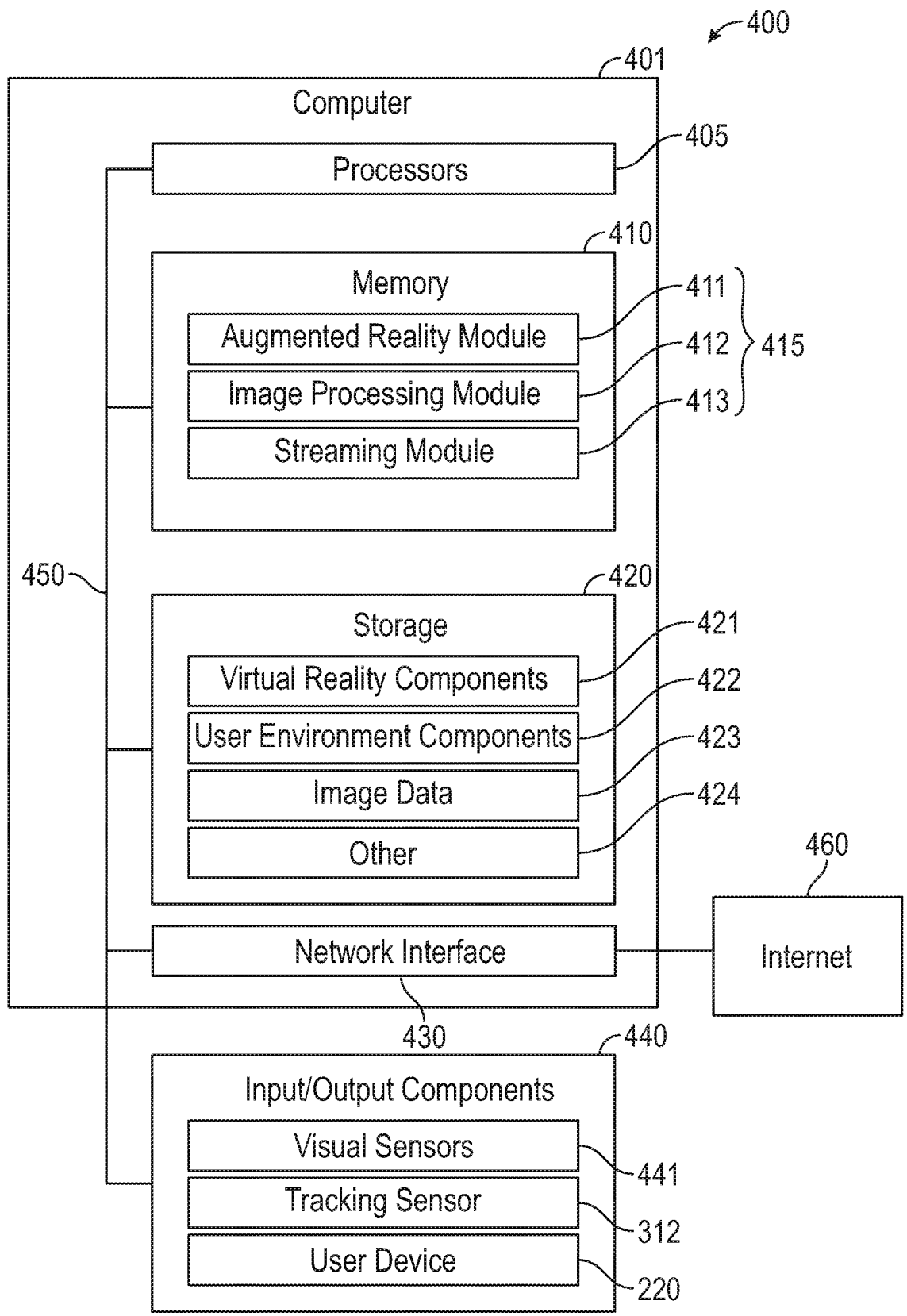
FIG. 4 illustrates a block diagram of system for capturing virtual and real world images, according to one embodiment described herein.

FIG. 4 illustrates a block diagram of a system for capturing AR and real world images, according to one embodiment described herein. As shown in FIG. 4, the arrangement 400 may include a computer embodied as an all in one head mounted AR device, mobile device configured to connect to a head mounted AR device, etc. (referred to herein as computer 401 for reference), which executes the functions of the system AR device 206 shown in FIG. 2A, and perform the methods described herein. The computer 401 is shown in the form of a general-purpose computing device. The components of computer 401 may include, but are not limited to, one or more processors or processing units 405, a system memory 410, a storage system 420, a bus 450 that couples various system components including the system memory 410 and storage system 420 to processors 405 along with an external network interface 430, connected to the internet 460, and input/output components 440. The input/output components include visual sensors 441, tracking sensor 312, and user device 220. In some embodiments, arrangement 400 is distributed and includes a plurality of discrete computing devices that are connected through wired or wireless networking.

Memory 410 may include a plurality of program modules 415 for performing various functions related to capturing virtual and real world images, described herein. The modules 415 generally include program code that is executable by one or more of the processors 405. As shown, modules 415 include augmented reality module 411, image processing module 412, and streaming module 413. In some examples, the modules 415 may be distributed and/or cloud based applications/modules. Additionally, storage system 420 may include media for virtual reality components 421, user environment components 422, image data 423, and other information 424. The information stored in storage system 420 may be updated and accessed by the program modules 415 described herein.

Figure 5:
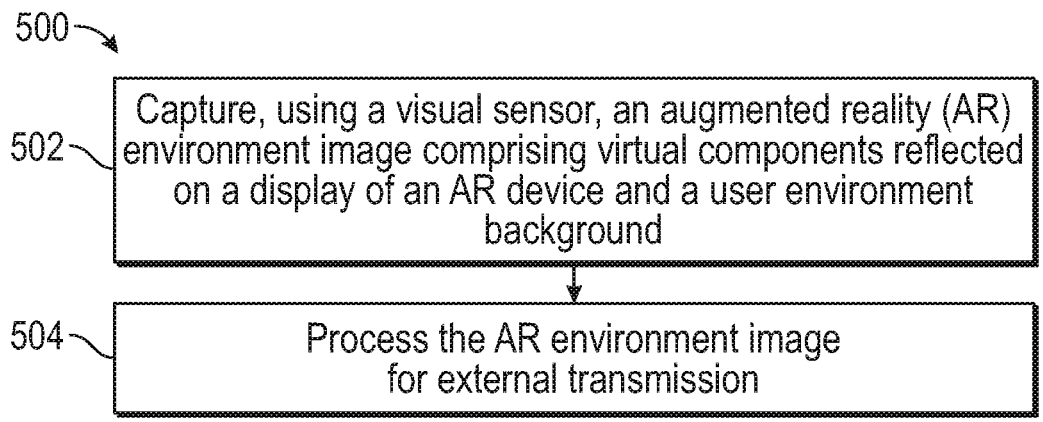
FIGS. 5-9 are flowcharts for capturing virtual and real world images, according to one embodiment described herein.

FIG. 5 is flowchart of a method 500 for capturing AR and real world images. Method 500 begins at block 502 where an AR device, such as AR device 206, captures using a visual sensor fixed within an AR device and facing a display of the AR device, a reflected augmented reality (AR) environment image comprising virtual components and a user environment background, where the virtual components and the user environment background are reflected on the display. For example, as shown in FIG. 2B, the AR device, using augmented reality module 411 and virtual reality components 421 and through AR output 302, displays the virtual component 102 on the display 204. In some examples, as described above, the user device 220 may function as the AR output such that the display 222 outputs the virtual component 102 onto the display 204. The AR device then uses any of the visual sensors 202, 252, and/or 254 to capture the AR environment image reflected off of the display 204 and/or the lens 316.

In some examples, the display 204 of AR device 206 includes the beam splitter 308 which combines, along with the lens 316, the AR with a real world view by directing the virtual components onto the display of the AR device. In some examples, the visual sensor is positioned on a side of the display opposite of a line of sight between the user of the AR device and the display of the AR device, such as visual sensor 254. In some examples, the visual sensor (e.g. visual sensor 252), is positioned within a line of sight between a user of the AR device and the display of the AR device. The AR image captured with the visual sensor 252 needs minimal or no processing in order to adequately capture the user experience.

Method 500 continues at block 504, where the AR device, such as AR device 206, processes the AR environment image for external transmission. For example, the AR device 206, using augmented reality module 411, and streaming module 413, readies the AR environment image for streaming and/or recording/storage. For example, the AR environment image captured using visual sensor 254 is processed to correct any offsets or distortion from the positioning of the visual sensor and to flip the image.

In an example using the visual sensor 252, i.e. the visual sensor is positioned within a line of sight between a user of the AR device and the display of the AR device, processing the AR environment image for external transmission only requires processing to correct any offset from the positioning of the visual sensor. In an instance where the visual sensor 252 is positioned in the center of the user eye 310, (even if blocking the vision of the user) no processing may be need to correct the AR environment image. In an example using the visual sensor 254, i.e., the visual sensor is positioned on a side of or above the lens 316 opposite of the line of sight and looking back display of the AR device, the processing the AR environment image for external transmission only requires processing to correct any offsets or distortion from the positioning of the visual sensor and to flip the image since the image will be reflected by the beam splitter 308.

Figure 6:
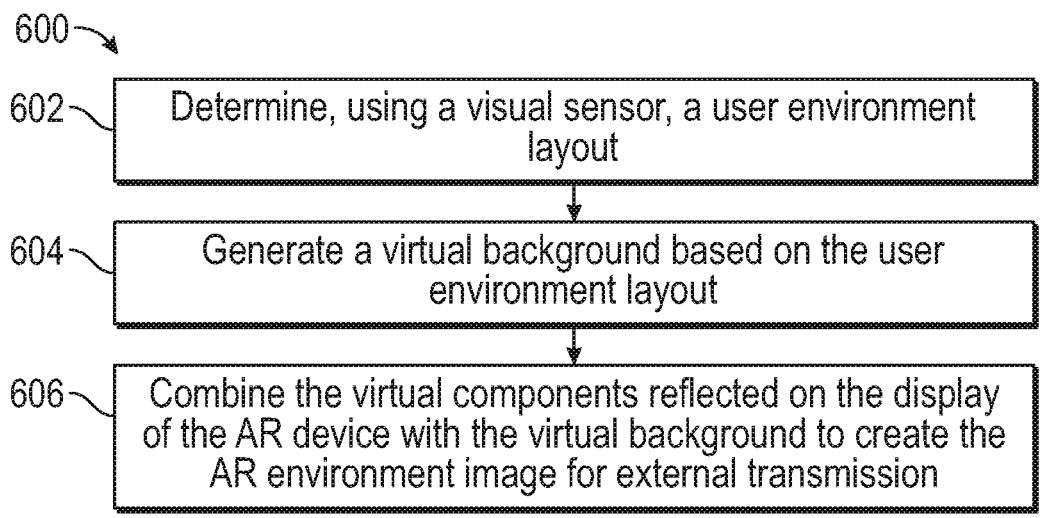

FIG. 6 is flowchart of a method 600 for processing the AR environment image. Method 600 begins at block 602 where an AR device, such as AR device 206, determines, using a visual sensor, a user environment layout. In some examples, the forward facing visual sensor 202 is used by the AR device 206 and image processing module 412 to determine the user environment layout. For example, as shown in FIG. 1, the image processing module 412 may determine a type for each of the physical components in the FOV 100. For example, the image processing module may determine that physical component 105a is a lamp and physical component 105d is a chair, as well as determining other physical and dimensional aspects of the FOV 100.

Method 600 continues at block 604, where the AR device, such as AR device 206, generates a virtual background based on the user environment layout. For example, the augmented reality module 411, using the determined user environment layout information and user environment components 422, generates a virtual background. In this example, the virtual background may represent generic virtual versions of the physical components shown in the FOV 100. This can provide privacy for the user who may stream their gameplay in their own home or other private setting.

Method 600 continues at block 606, where the AR device, such as AR device 206, combines the virtual components reflected on the display of the AR device with the virtual background to create the AR environment image for external transmission. For example, the augmented reality module 411 and the image processing module 412 combine the virtual component 102 and the virtual background in order to generate the more private and/or generic AR environment image for an external transmission, such as to a real-time live streaming service.

Figure 7:
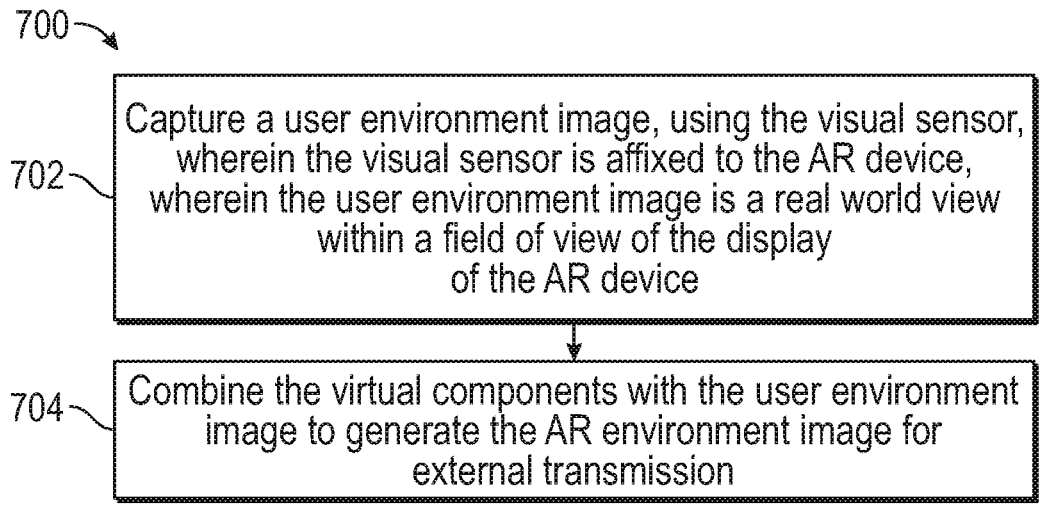

FIG. 7 is flowchart of a method 700 for capturing AR and real world images. Method 700 begins at block 702 where an AR device, such as AR device 206, captures a user environment image, using the visual sensor, wherein the visual sensor is affixed to the AR device, wherein the user environment image is a real world view within a field of view of the display of the AR device. In some examples, the forward facing visual sensor 202 is used by the AR device 206 and image processing module 412 to capture the user environment image and for the creation of the AR environment image. In another example, such as utilizing visual sensors 252 and 254, the visual sensor is positioned such that the visual sensor captures both the displayed AR, including the virtual components and a user environment image.

Method 700 continues at block 704, where the AR device, such as AR device 206, combines the virtual components with the user environment image to generate the AR environment image for external transmission. This is accomplished by using sensor 202 and the image processing module 412 to generate the next frame of AR overlays.

Figure 8:
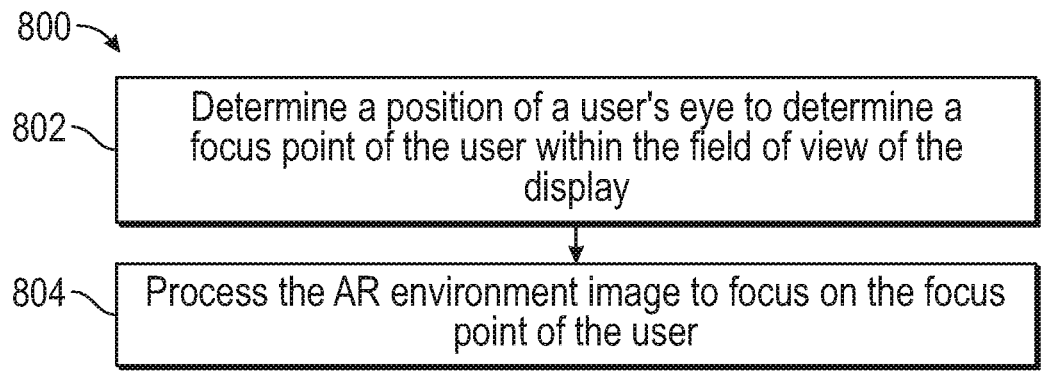

FIG. 8 is flowchart of a method 800 for capturing AR and real world images. Method 800 begins at block 802 where an AR device, such as AR device 206, determines a position of a user's eye to determine a focus point of the user within the field of view of the display. For example, the augmented reality module 411 using the tracking sensor 312 determines a position of a user's eye to determine a focus point of the user within the field of view of the display. For example if a user is focusing on the right side of the FOV 100, the AR device 206 determines the focus point on the right side of the image and/or calibrates the AR image captured by the visual sensors 252, 254, 202 to enhance the AR experience with user-focusing features.

Method 800 continues at block 804, where the AR device, such as AR device 206, captures and/or processes, using image processing module 412, a user environment image, such as described above in relation to FIGS. 6 and 7, based on the focus point For example, the user environment image may only include a focused portion of the FOV 100.

Figure 9:
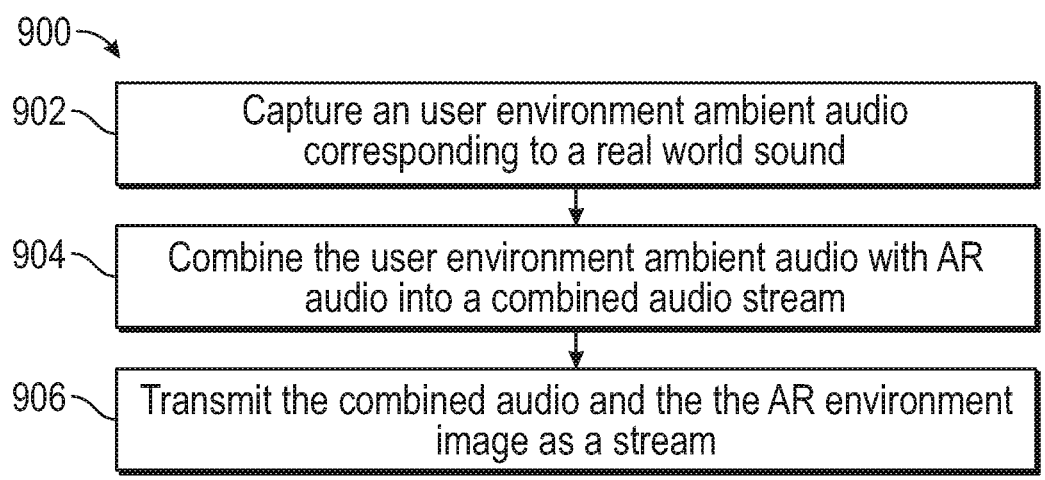

FIG. 9 is flowchart of a method 900 for capturing AR and real world images. Method 900 begins at block 902 where an AR device, such as AR device 206, captures an user environment ambient audio corresponding to a real world sound. In some examples, the AR device 206, using streaming module 413 may receive the user environment ambient audio from the user device 220 and/or other audio speakers/microphones attached to the AR device 206.

Method 900 continues at block 904 and 906, where the AR device, such as AR device 206, combines the user environment ambient audio with AR audio into a combined audio stream and transmits the combined audio and the AR environment images as a stream. For example, the AR device 206, using streaming module 413, may create a stream for external use or playback (e.g., streaming to a service via network interface 430 and/or recording into storage) by combining the ambient audio, any audio associated with the gameplay and the virtual components of the AR, and the AR environment image. This provides a viewer of the stream the same real-time immersive experience that the user is experiencing.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As described above, including in relation to FIG. 4, various computing components may be included to perform the methods described herein. For example, bus 450 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Further, computer 401 typically includes a variety of computer system readable media. Such media may be any available media that is accessible by computer 401, and it includes both volatile and non-volatile media, removable and non-removable media.

System memory 410 can include computer system readable media in the form of volatile memory, such as random access memory (RAM) and/or cache memory. Computer 401 may further include other removable/non-removable, volatile/non-volatile computer system storage media. In some examples, storage system 420 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 450 by one or more data media interfaces.

As depicted and described above, memory 410 may include at least one program product having a set (e.g., at least one) of program modules 415 that are configured to carry out the functions of embodiments of the invention. Computer 401 may further include other removable/non-removable volatile/non-volatile computer system storage media. In some examples, storage system 420 may be included as part of memory 410 and may typically provide a non-volatile memory for the networked computing devices, and may include one or more different storage elements such as Flash memory, a hard disk drive, a solid state drive, an optical storage device, and/or a magnetic storage device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    capturing, using a visual sensor fixed within an augmented reality (AR) device and facing a display of the AR device, an AR environment image,
        wherein the AR environment image comprises at least one virtual component and a user environment background,
        wherein the at least one virtual component and the user environment background are simultaneously captured by the visual sensor,
        wherein the user environment background is a real world view within a field of view of the display,
        wherein the visual sensor is positioned within the AR device and between a center of a line of sight of an eye of a user of the AR device and the display of the AR device, wherein the visual sensor is positioned in the AR device to match a position of the eye of the user to prevent offset correction image processing prior to external transmission, wherein the AR environment image comprises a field of view of the display as viewed by the eye of the user within the AR device,
        wherein a light associated with the user environment background and captured by the visual sensor passes directly through the display of the AR device to the visual sensor, and
        wherein the at least one virtual component is reflected on the display of the AR device; and
    processing the AR environment image for external transmission.
2. The method of claim 1, wherein processing the AR environment image further comprises:
    determining, using the visual sensor, a user environment layout; and
    generating a virtual background based on the user environment layout; and
    combining the at least one virtual component reflected on the display of the AR device with the virtual background to create the AR environment image for external transmission.
3. The method of claim 1, wherein capturing the AR environment image comprises:
    capturing a user environment image, using the visual sensor, wherein the visual sensor is affixed to the AR device; and
    combining the at least one virtual component with the user environment image to generate the AR environment image for external transmission.
4. The method of claim 1, wherein the AR device comprises an all in one head mounted AR device.
5. The method of claim 1, wherein the visual sensor is positioned within a line of sight between the user of the AR device and the display of the AR device.
6. The method of claim 1, wherein the display of AR device comprises a beam splitter configured to combine the AR with the real world view by directing the at least one virtual component onto the display of the AR device.
7. The method of claim 1, wherein processing the AR environment image for external transmission further comprises:
    determining a position of the eye of the user to determine a focus point of the user within the field of view of the display; and
    wherein processing the AR environment image for external transmission comprises:
        processing the AR environment image to focus on the focus point of the user.
8. The method of claim 1, further comprising:
    capturing an user environment ambient audio corresponding to a real world sound;
    combining the user environment ambient audio with AR audio into a combined audio stream; and
    transmitting the combined audio and the AR environment image as a stream.
9. A computer-readable storage medium comprising computer-readable program code embodied therewith, the computer-readable program code is configured to perform, when executed by a processor, an operation, the operation comprising:
    capturing, using a visual sensor fixed within an augmented reality (AR) device and facing a display of the AR device, an AR environment image,
        wherein the AR environment image comprises at least one virtual component and a user environment background,
        wherein the at least one virtual component and the user environment background are simultaneously captured by the visual sensor,
        wherein the user environment background is a real world view within a field of view of the display,
        wherein the visual sensor is positioned within the AR device and between a center of a line of sight of an eye of a user of the AR device and the display of the AR device, wherein the visual sensor is positioned in the AR device to match a position of the eye of the user to prevent offset correction image processing prior to external transmission, wherein the AR environment image comprises a field of view of the display as viewed by the eye of the user within the AR device, wherein a light associated with the user environment background and captured by the visual sensor passes directly through the display of the AR device to the visual sensor, and wherein the at least one virtual component is reflected on the display of the AR device; and processing the AR environment image for external transmission.

10. The computer-readable storage medium of claim 9, wherein determining the user environment background comprises:

determining, using the visual sensor, a user environment layout; and generating a virtual background based on the user environment layout; and combining the at least one virtual component reflected on the display of the AR device with the virtual background to create the AR environment image for external transmission.

11. The computer-readable storage medium of claim 9, wherein determining the user environment background comprises:

capturing a user environment image, using the visual sensor, wherein the visual sensor is affixed to the AR device; and combining the at least one virtual component with the user environment image to generate the AR environment image for external transmission.

12. The computer-readable storage medium of claim 9, wherein the visual sensor is positioned within a line of sight between the user of the AR device and the display of the AR device.

13. The computer-readable storage medium of claim 9, wherein the display of AR device comprises a beam splitter configured to combine the AR with the real world view by directing the at least one virtual component onto the display of the AR device.

14. The computer-readable storage medium of claim 9, wherein the operation further comprises:

determining a position of the eye of the user to determine a focus point of the user within the field of view of the display; and wherein processing the AR environment image for external transmission comprises:

processing the AR environment image to focus on the focus point of the user.

15. A system, comprising:

a processor; and a memory comprising instructions which, when executed on the processor, performs an operation, the operation comprising:

capturing, using a visual sensor fixed within an augmented reality (AR) device and facing a display of the AR device, an AR environment image, wherein the AR environment image comprises at least one virtual component and a user environment background, wherein the at least one virtual component and the user environment background are simultaneously captured by the visual sensor, wherein the user environment background is a real world view within a field of view of the display, wherein the visual sensor is positioned within the AR device and between a center of a line of sight of an eye of a user of the AR device and the display of the AR device, wherein the visual sensor is positioned in the AR device to match a position of the eye of the user to prevent offset correction image processing prior to external transmission, wherein the AR environment image comprises a field of view of the display as viewed by the eye of the user within the AR device, wherein a light associated with the user environment background and captured by the visual sensor passes directly through the display of the AR device to the visual sensor, and wherein the at least one virtual component is reflected on the display of the AR device; and processing the AR environment image for external transmission.

16. The system of claim 15, wherein determining the user environment background comprises:

capturing a user environment image, using the visual sensor, wherein the visual sensor is affixed to the AR device; and combining the at least one virtual component with the user environment image to generate the AR environment image for external transmission.

17. The system of claim 15, wherein the visual sensor is positioned within a line of sight between the user of the AR device and the display of the AR device.

18. The system of claim 15, wherein the display of AR device comprises a beam splitter configured to combine the AR with the real world view by directing the at least one virtual component onto the display of the AR device.

19. The system of claim 15, wherein processing the AR environment image for external transmission further comprises:

determining a position of a user's eye to determine a focus point of the eye of the user within the field of view of the display; and wherein processing the AR environment image for external transmission comprises:

processing the AR environment image to focus on the focus point of the user.

20. The system of claim 15, wherein the operation further comprises:

capturing an user environment ambient audio corresponding to a real world sound;

combining the user environment ambient audio with AR audio into a combined audio stream; and transmitting the combined audio and the AR environment image as a stream.

* * * * *